(12) United States Patent
Kwak et al.

(10) Patent No.: US 12,262,334 B2
(45) Date of Patent: Mar. 25, 2025

(54) RANDOM ACCESS PROCEDURES BASED ON PHYSICAL DOWNLINK CONTROL CHANNEL (PDDCH) ORDERS

(71) Applicant: Apple Inc., Cupertino, CA (US)

(72) Inventors: Yongjun Kwak, Portland, OR (US); Daewon Lee, Portland, OR (US); Gregory Morozov, Nizhny Novgorod (RU); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 17/267,085

(22) PCT Filed: Aug. 9, 2019

(86) PCT No.: PCT/US2019/045996
§ 371 (c)(1),
(2) Date: Feb. 9, 2021

(87) PCT Pub. No.: WO2020/033887
PCT Pub. Date: Feb. 13, 2020

(65) Prior Publication Data
US 2021/0314885 A1    Oct. 7, 2021

Related U.S. Application Data

(60) Provisional application No. 62/717,547, filed on Aug. 10, 2018.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 52/36* (2013.01); *H04W 72/23* (2023.01); *H04W 74/0833* (2013.01)

(58) Field of Classification Search
None
See application file for complete search history.

(56) References Cited

U.S. PATENT DOCUMENTS

2012/0113866 A1    5/2012  Tenny et al.
2014/0341192 A1   11/2014  Venkob et al.
(Continued)

FOREIGN PATENT DOCUMENTS

| EP | 2579487 A1 | 4/2013 |
| WO | WO 2015-133823 A1 | 9/2015 |
| WO | WO 2017197224 A1 | 11/2017 |

OTHER PUBLICATIONS

3GPP, TS 38.213 V15.2.0 (Jun. 2018), "3rd Generation Partnership Project; Technical Specification Group Radio Access Network; NR; Physical layer procedures for control (Release 15)," 650 Route des Lucioles—Sophia Antipolis Valbonne—France; 99 pages.
(Continued)

*Primary Examiner* — Otis L Thompson, Jr.
(74) *Attorney, Agent, or Firm* — Sterne, Kessler, Goldstein & Fox P.L.L.C.

(57) ABSTRACT

Methods, systems, and storage media are described for random access procedures triggered based on physical downlink control channel (PDDCH) orders. Other embodiments may be described and/or claimed.

20 Claims, 9 Drawing Sheets

(51) Int. Cl.
  *H04W 52/36* (2009.01)
  *H04W 72/23* (2023.01)
  *H04W 74/0833* (2024.01)

(56) References Cited

U.S. PATENT DOCUMENTS

| | | | |
|---|---|---|---|
| 2015/0230210 A1 | 8/2015 | Lee et al. | |
| 2016/0044650 A1* | 2/2016 | Enescu | H04W 72/20 |
| | | | 370/329 |
| 2016/0142189 A1* | 5/2016 | Shin | H04B 7/0626 |
| | | | 370/329 |
| 2017/0290046 A1 | 10/2017 | Sun et al. | |
| 2018/0324716 A1 | 11/2018 | Jeon et al. | |
| 2018/0324853 A1 | 11/2018 | Jeon et al. | |
| 2019/0053171 A1 | 2/2019 | Jung et al. | |
| 2019/0053313 A1 | 2/2019 | Zhou et al. | |
| 2019/0059012 A1 | 2/2019 | Nam et al. | |
| 2019/0190582 A1 | 6/2019 | Guo et al. | |
| 2019/0215706 A1 | 7/2019 | Tsai | |
| 2019/0253986 A1 | 8/2019 | Jeon et al. | |
| 2019/0274169 A1 | 9/2019 | Tsai et al. | |
| 2019/0349866 A1* | 11/2019 | Lin | H04W 52/242 |
| 2020/0022089 A1* | 1/2020 | Guo | H04W 52/26 |
| 2020/0119898 A1* | 4/2020 | Orsino | H04L 5/001 |
| 2020/0221401 A1 | 7/2020 | Zhu et al. | |
| 2020/0244413 A1 | 7/2020 | Takeda et al. | |
| 2020/0366358 A1 | 11/2020 | Zhu et al. | |
| 2021/0160126 A1* | 5/2021 | Cirik | H04W 52/0241 |
| 2021/0314885 A1* | 10/2021 | Kwak | H04W 52/247 |
| 2021/0392531 A1* | 12/2021 | Lu | H04W 52/146 |
| 2022/0095276 A1* | 3/2022 | Aiba | H04W 48/18 |

OTHER PUBLICATIONS

3GPP, TS 38.214 V15.2.0 (Jun. 2018), "3rd Generation Partnership Project; Technical Specification Group Radio Access Network; NR; Physical layer procedures for data (Release 15)," 650 Route des Lucioles—Sophia Antipolis Valbonne—France; 94 pages.

International Preliminary Report on Patentability directed to related International Patent Application No. PCT/US2019/045996, dated Feb. 16, 2021; 8 pages.

Intel Corporation, "NR RACH procedures", 3GPP TSG RAN WG1 Meeting #92bis, R1-1804707, Sanya, China, April 16-Apr. 20, 2018. Retrieved from https://www.3gpp.org/ftp/TSG_RAN/WG1_RL1/TSGR1_92b/Docs/R1-1804707.zip; 6 pages.

Nokia, "CR to 38.214 capturing the RAN1#92bis and RAN1#93 meeting agreements", R1-1807958, 3GPP TSG-RAN1 Meeting #93, Busan, Korea, Jun. 7, 2018, 89 pages.

Huawei et al., "Multiplexing RSs and other signals", R1-1719437, 3GPP TSG RAN WG1 Meeting #91, Nov. 17, 2017, 4 pages.

Intel Corp., "NR RACH procedures", R1-1804707, 3GPP TSG RAN WG1 Meeting #92bis, Sanya, China, Apr. 7, 2018, 15 pages.

Huawei et al., "Remaining details of UL power control design", R1-1801462, 3GPP TSG RAN WG1 Meeting #92, Athens, Greece, Feb. 16, 2018, 14 pages.

International Search Report and Written Opinion of the International Searching Authority directed to related International Patent Application No. PCT/US2019/045996, dated Nov. 28, 2019, 10 pages.

NTT Docomo, Inc., "Remaining issued on RACH procedure," R1-1807054, May 12, 2018; 3 pages.

Renesas Mobile Europe Ltd., "Downlink control signaling for CoMP," R1-121395, Mar. 20, 2012; 3 pages.

Wang, "An Investigation on Group Handover Strategy of Cellular Wireless Network under High Mobility Scenarios," with English-language abstract available on pp. 7 and 8, May 2014; 64 pages.

Iwelski et al., "Reliable Implicit Feedback Generation in Unsynchronized CoMP Transmission," Jun. 29, 2015; 5 pages.

Second Office Action and Search Report directed to related Chinese Application No. 201980053713.5, with English-language machine translation attached, mailed May 31, 2014; 38 pages.

3GPP TS 38.321 V15.2.0 (Jun. 2018), 3rd Generation Partnership Project; Technical Specification Group Radio Access Network; NR; Medium Access Control (MAC) protocol specification (Release 15); 73 pages.

* cited by examiner

300

Generating a configuration message that includes configuration information including: a synchronization signal-physical broadcast channel (ss-PBCH) block power parameter, and a synchronization signal power control offset (powerControlOffsetSS) parameter
305

Encoding the configuration message for transmission to the UE
310

| QCL Info 1 | | QCL Info 2 (optionally configured) | | Notes |
|---|---|---|---|---|
| RS | QCL Type | RS | QCL Type | |
| CSI-RS for Tracking (TRS) | Type A | Same CSI-RS as QCL Info 1 | Type D | |
| CSI-RS for Tracking (TRS) | Type-A | CSI-RS for Beam Management (BMRS) | Type D | If the QCL Info 2 is configured, RS with QCL Type D is used for RLM Measurements |
| CSI-RS (CSI feedback) | Type-A | N/A | N/A | Only in FR1 (when Type D is not applicable) |

FIG. 4A

RANDOM ACCESS PROCEDURES BASED ON PHYSICAL DOWNLINK CONTROL CHANNEL (PDDCH) ORDERS

CROSS REFERENCE TO RELATED APPLICATION

This application is a U.S. National Phase of International Application No. PCT/US2019/045996, filed Aug. 9, 2019, which claims priority to U.S. Provisional Patent Application No. 62/717,547 filed Aug. 10, 2018, entitled "Mechanisms on Random Access Triggered by PDCCH Order," the entire disclosures of which are incorporated by reference in their entirety.

BACKGROUND

Among other things, embodiments described herein are directed to random access procedures triggered based on physical downlink control channel (PDDCH) orders. Embodiments of the present disclosure may be used to help perform random access channel (RACH) transmissions for new radio (NR).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4A illustrates an example of channel state information-reference signal (CSI-RS) usage based on quasi-coloration (QCL) information in accordance with some embodiments

DETAILED DESCRIPTION

Figure 1:
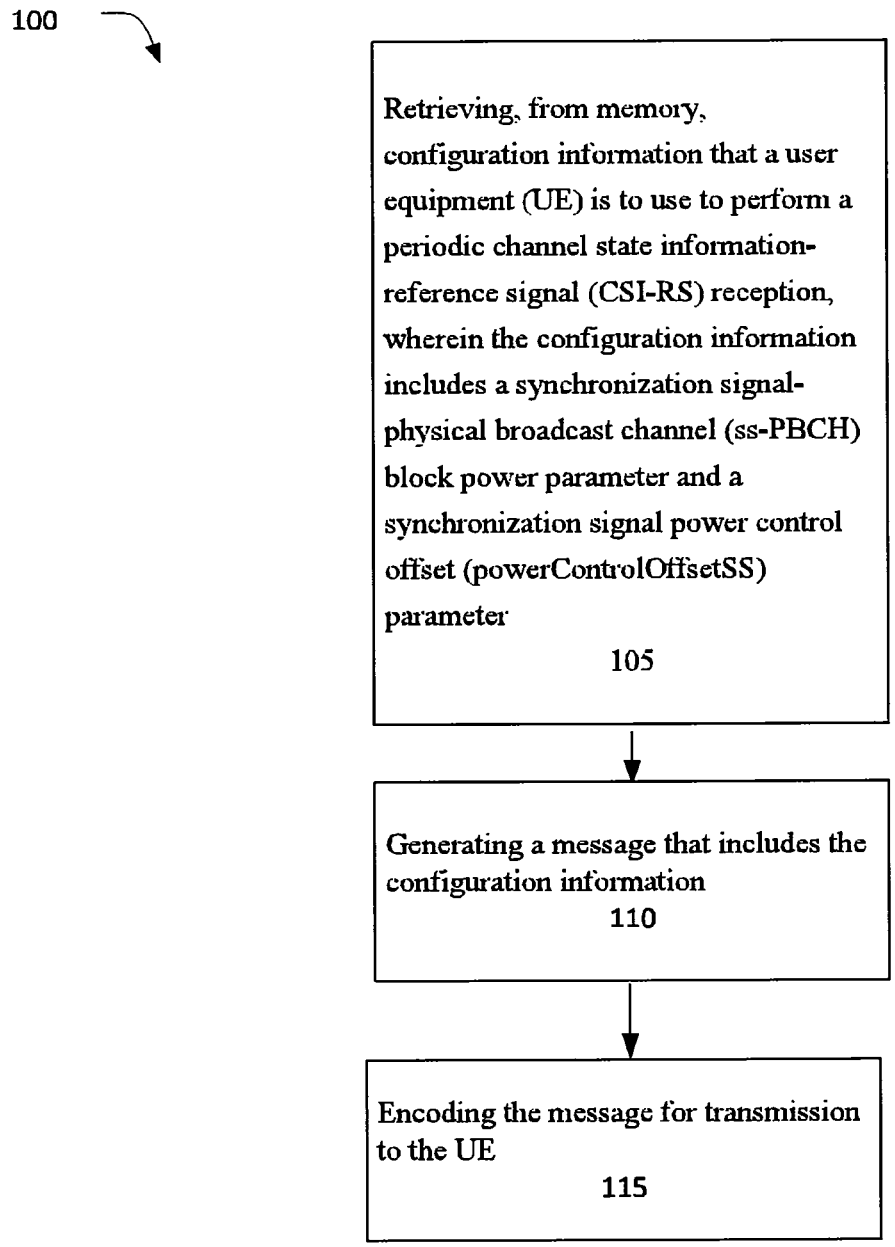
FIGS. 1 and 2, and 3 illustrate examples of operation flow/algorithmic structures in accordance with some embodiments.

Embodiments discussed herein may relate to random access procedures triggered based on physical downlink control channel (PDDCH) orders. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those stilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Currently, the PDCCH order is supported for triggering random access procedure by defining specific downlink control information (DCI). For example, DCI format 1_0 is used for the scheduling of PDSCH in one DL cell. The following information is transmitted by means of the DCI format 1_0 with CRC scrambled by a radio network temporary identifier (RNTI) such as C-RNTI, CS-RNTI, or new-RNTI:

Identifier for DCI formats—1 bits (the value of this bit field is always set to 1, indicating a DL DCI format)

Frequency domain resource assignment—$\lceil \log_2 (N_{RE}^{DL,BWP}(N_{RB}^{DL,SWP}+1)/2) \rceil$ bits, wherein $N_{P.B}^{DL,BWP}$ is the size of the active DL bandwidth part in case DCI format 1_0 is monitored in the UE specific search space and satisfying: the total number of different DCI sizes monitored per slot is no more than 4 for the cell, and the total number of different DCI sizes with C-RNTI monitored per slot is no more than 3 for the cell, otherwise, $N_{RB}^{DL,BWP}$ is the size of the initial DL bandwidth part.

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex.

uplink/supplementary uplink (UL/SUL) indicator—1 bit. If the value of the "Random Access Preamble index" is not all zeros and if the UE is configured with SUL in the cell, this field indicates which UL carrier in the cell to transmit the PRACH according to Table 7.3.1.1.1-1; otherwise, this field is reserved.

SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved.

Reserved bits—10 bits.

Based on the above, if a User Equipment (UE) receives the DCI including the above information, then the UE has to transmit the random access preamble using indicated preamble index, indicated RACH occasion along with the associated SS/PBCH index indicated by the DCI.

If this PDCCH order is received by the UE, the UE needs to calculate the power for the transmission of a corresponding PRACH and the power equation requires the path loss information between the NR base station (called gNB) and the UE. This path loss information is obtained by measuring some reference signals (RS) and the reference signals to measure needs to be configured beforehand. And also the reference Tx power for the RS has to be known to the UE beforehand to calculate the accurate transmission power for PRACH. According to 3GPP TS 38.213 v. 15.2.0, 2018-06-29:

If the PRACH transmission from the UE is not in response to a detection of a PDCCH order by the UE, or is in response to a detection of a PDCCH order by the UE that triggers a contention based random access procedure, referenceSignalPower is provided by ss-PBCH-BlockPower.

If the PRACH transmission from the UE is in response to a detection of a PDCCH order by the UE that triggers a non-contention based random access procedure and depending the DL RS that the DM-RS of the PDCCH order is quasi-collocated with as described in Subclause 10.1, referenceSignalPower is provided by ss-PBCH-BlockPower or, when the UE is configured resources for a periodic CSI-RS reception, referenceSignalPower is obtained by higher layer parameters ss-PBCH-BlockPower and powerControlOffsetSS where powerControlOffsetSS provides an offset of CSI-RS transmission power relative to SS/PBCH block transmission power [6, TS 38.214]. If powerControlOffsetSS is not provided to the UE, the UE assumes an offset of 0 dB.

From the above paragraphs, the referenceSignalPower can be provided by either ss-PBCH-BlockPower or ss-PBCH-BlockPower along with powerControlOffsetSS depending on whether RACH is associated with SSB or CSI-RS.

However, 3GPP TS 38.214 v. 15.2.0, 2018-06-29 indicates that PDCCH is QCL'ed with CSI-RS if the TCI sate is activated. In that scenario, there is no case that ss-PBCH-BlockPower becomes the referenceSignalPower for PRACH, which may need to be supported. For example:

For the DM-RS of PDCCH, the UE shall expect that a TCI-State indicates one of the following quasi co-location type(s):

'QCL-TypeA' with a CSI RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition, when 'QCL-TypeD' is not applicable.

Additionally, there can be multiple CSI-RSs with which the PDCCH is quasi co-located (QCL-ed). Therefore, it is unclear which CSI-RS has to be considered for the referenceSignalPower for the RACH transmission.

Embodiments herein provide mechanisms on random access triggered by PDCCH order.

For the PRACH, the UE determines a transmission power for a physical random access channel (PRACH), $P_{PRACH,b,f,c}(i)$, on active UL BWP b of carrier f based on a current SS/PBCH block determination for serving cell c in transmission occasion i as $$P_{PRACH,b,f,c}(i) = \min\{P_{CLAZ,f,c}(i) P_{PRACH,target,f,c} + PL_{b,f,c}\}[dBm],$$

where $P_{cMAX,f,c}(i)$ is the configured UE transmission power for carrier f of serving cell c within transmission occasion i, $P_{PRACH,target,f,c}$ is the PRACH preamble target reception power PREAMBLE_RECEIVED_TARGET_POWER provided by higher layers for the UL BWP b of carrier f of serving cell c, and $PL_{b,f,c}$ is a pathloss for the UL BWP b of carrier f for the current SS/PBCH block of serving cell c calculated by the UE in dB as referenceSignalPower—higher layer filtered RSRP, where RSRP is defined elsewhere and the higher layer filter configuration is defined elsewhere.

If a UE has received higher layer parameter TCI-StatesPDCCH containing a single TCI state or if the UE has received a MAC CE activation command for one of the TCI states, the UE assumes that the DM-RS antenna port associated with PDCCH reception is quasi co-located with the one or more DL RS configured by the TCI state.

However, depending on the TCI state of the UE, QCL information can be different and multiple CSI-RS can be utilized for different QCL as shown in the Table 4. Here type-A QCL indicates that reference signals are QCL'ed with respect to Doppler shift, Doppler spread, average delay, and delay spread. And type-D QCL indicates that reference signals are QCL'ed with respect to Spatial Rx parameter.

In one embodiment, when the UE is configured resources for a periodic CSI-RS reception, and when CSI-RS for tracking is configured for QCL info1 and CSI-RS for Beam Management is configure for QCL info 2, referenceSignalPower can be obtained by higher layer parameters ss-PBCH-BlockPower and powerControlOffsetSS where powerControlOffsetSS provides an offset of transmission power of CSI-RS for tracking (TRS) relative to SS/PBCH block transmission power. Here the CSI-RS for tracking can be defined as "CSI-RS resource in a NZP-CSI-RS-ResourceSet configured with higher layer parameter trs-Info" and CSI-RS for beam management can be defined as "CSI-RS resource in a NZP-CSI-RS-ResourceSet configured with higher layer parameter repetition."

In another embodiment, when the UE is configured resources for a periodic CSI-RS reception, and when CSI-RS for tracking is configured for QCL info1 and CSI-RS for Beam Management is configure for QCL info 2, referenceSignalPower can be obtained by higher layer parameters ss-PBCH-BlockPower and powerControlOffsetSS where powerControlOffsetSS provides an offset of transmission power of CSI-RS for beam management (BMRS) relative to SS/PBCH block transmission power. Here the CSI-RS for tracking can be defined as "CSI-RS resource in a NZP-CSI-RS-ResourceSet configured with higher layer parameter trs-Info" and CSI-RS for beam management can be defined as "CSI-RS resource in a NZP-CSI-RS-ResourceSet configured with higher layer parameter repetition."

In another embodiment, in DCI format 1_0 for random access procedure initiated by a PDCCH order, one additional bit (RS_indication_bit) can be added for indicating whether referenceSignalPower is provided by ss-PBCH-BlockPower or by both ss-PBCH-BlockPower and powerControlOffsetSS, where powerControlOffsetSS indicates an offset of CSI-RS transmission power relative to SS/PBCH block transmission power. This RS indicating bit enables that NW associates PRACH with either SS/PBCH or CSI-RS even if the case that UE has received higher layer parameter TCI-StatesPDCCH containing a single TCI state or if the UE has received a MAC CE activation command for one of the TCI states. If the RS_indication_bit is 0, then referenceSignalPower is provided by ss-PBCH-BlockPower and SSB is used for the path loss estimation for the PRACH transmission. Here the path loss estimation can be based on the SSB which is indicated by the DCI for the PDCCH order. If the RS_indication_bit is 1, then referenceSignalPower is provided by ss-PBCH-BlockPower and powerControlOffsetSS and CSI-RS is used for the path loss estimation for the PRACH transmission.

In another embodiment, referenceSignalPower is provided by ss-PBCH-BlockPower or by both ss-PBCH-BlockPower and powerControlOffsetSS depending on whether CSI-RS is QCL-ed with SSB. If CSI-RS is QCL-ed with SSB, then UE assumes that SSB is associated with PRACH and referenceSignalPower is provided by ss-PBCH-BlockPower. However, If CSI-RS is not QCL-ed with SSB, then UE assumes that CSI-RS is associated with PRACH and referenceSignalPower is provided by ss-PBCH-BlockPower and powerControlOffsetSS, where powerControlOffsetSS provides an offset of CSI-RS transmission power relative to SS/PBCH block transmission power.

Beam Management

In NR implementations, beam management refers to a set of L1/L2 procedures to acquire and maintain a set of transmission/reception point(s) (TRP or TRxP) and/or UE beams that can be used for downlink (DL) and uplink (UL) transmission/reception. Beam management includes various operations or procedures, such as beam determination, beam management, beam reporting, and beam sweeping operations/procedures. Beam determination refers to TRxP(s) or UE ability to select of its own transmission (Tx)/reception (Rx) beam(s). Beam measurement refers to TRP or UE ability to measure characteristics of received beamformed signals. Beam reporting refers the UE ability to report information of beamformed signal(s) based on beam measurement. Beam sweeping refers to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management includes procedures P-1, P-2, and P-3. Procedure P-1 is used to enable UE measurement on different TRxP Tx beams to support selection of TRxP Tx beams/UE Rx beam(s). For beamforming at TRxP, procedure P-1 typically includes a intra/inter-TRxP Tx beam sweep from a set of different beams. For beamforming at the UE, procedure P-1 typically includes a UE Rx beam sweep from a set of different beams.

Procedure P-2 is used to enable UE measurement on different TRxP Tx beams to possibly change inter/intra-TRxP Tx beam(s). Procedure P-2 may be a special case of procedure P-1 wherein procedure P-2 is used for a possibly smaller set of beams for beam refinement than procedure P-1. Procedure P-3 is used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE reports measurement results of N selected Tx beams (where N may or may not be a fixed number). The procedure based on RS for mobility purpose is not precluded. Beam information that is to be reported includes measurement quantities for the Nbeam(s) and information indicating NDL Tx beam(s), if N<K. Other information or data may be included in or with the beam information. When a UE is configured with K'>1 non-zero power (NZP) CSI-RS resources, a UE can report N' CSI-RS Resource Indicator (CRIs).

In some NR implementations, a UE can trigger a mechanism to recover from beam failure, which is referred to a "beam recovery", "beam failure recovery request procedure", and/or the like. A beam failure event may occur when the quality of beam pair links) of an associated control channel falls below a threshold, when a time-out of an associated timer occurs, or the like. The beam recovery mechanism is triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure may be declared if one, multiple, or all serving PDCCH beams fail. The beam failure recovery request procedure is initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

In some implementations, beam management includes providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications are based on a Transmission Configuration Indication (TCI) state(s). The TCI state(s) are indicated in a TCI list that is configured by radio resource control (RRC) and/or Media Access Control (MAC) Control Element (CE). In some implementations, a UE can be configured up to M TCI-States by higher layer signaling to decode PDSCH according to a detected PDCCH with downlink control information (DCI) intended for the UE and the given serving cell where M depends on the UE capability. Each configured TCI state includes one reference signal (RS) set TCI-RS-SetConfig. Each TCI-RS-SetConfig includes parameters for configuring quasi co-location relationship(s) between the RSs in the RS set and the demodulation reference signal (DM-RS) port group of the PDSCH. The RS set includes a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive a selection command (e.g., in a MAC CE), which is used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE determines $\bar{q}_n$ to include SS/PBCH blocks and periodic CSI-RS configurations with same values for higher layer parameter TCI-StatesPDCCH as for control resource sets (CORESET) that the UE is configured for monitoring PDCCH.

The physical layer of a UE assesses the radio link quality according to a set $\bar{q}_0$ of resource configurations against a threshold $Q_{out,LR}$. The threshold $Q_{out,LR}$ corresponds to a default value of higher layer parameter RIM-IS-OOS-thresholdConfig and Beam-failure-candidate-beam-threshold, respectively. For the set $\bar{q}_0$, the UE assesses the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc SS.

In some implementations, if a beam failure indication has been received by a MAC entity from lower layers, then the MAC entity starts a beam failure recovery timer (beamFailureRecoveryTimer) and initiates a Random Access procedure. If the beamFailureRecoveryTimer expires, then the MAC entity indicates a beam failure recovery request failure to upper layers. If a DL assignment or UL grant has been received (e.g., on a PDCCH addressed for a cell radio network temporary identifier (C-RNTI)), then the MAC entity may stop and reset beamFailureRecoveryTimer and consider the beam failure recovery request procedure to be successfully completed.

Beam Measurement

In embodiments, a UE (e.g., in RRC_CONNECTED mode) measures one or multiple beams of a cell and the measurement results (power values) are averaged to derive the cell quality. The UE may be configured to consider a subset of the detected beams, such as the N best beams above an absolute threshold. Filtering takes place at two different levels include at the physical layer (PHY) to derive beam quality and then at the RRC level to derive cell quality from multiple beams. Cell quality from beam measurements may be derived in the same way for the serving cell(s) and for the non-serving cell(s). Measurement reports contain the measurement results of the Xbest beams if the UE is configured to do so by the gNB. For channel state estimation purposes, the UE may be configured to measure CSI-RS resources and estimate a downlink channel state based on the CSI-RS measurements. The UE feeds the estimated channel state back to the gNB to be used in link adaptation.

Figure 4B:
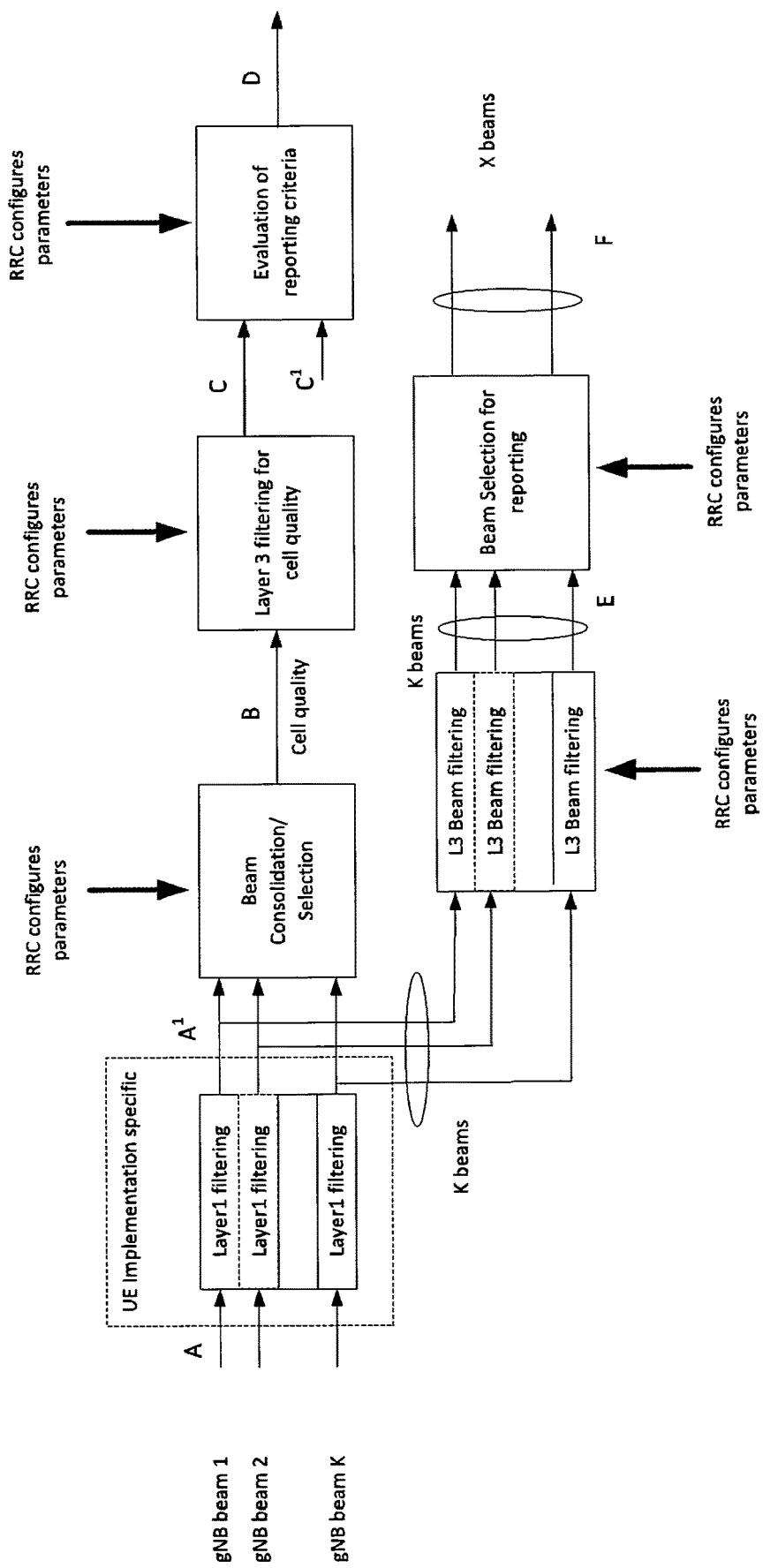
FIG. 4B illustrates an example of a measurement model in accordance with some embodiments.

An example of a measurement model is shown by FIG. 4B. In FIG. 4B, point A includes measurements (e.g., beam specific samples) internal to the PHY. Layer 1 (L1) filtering includes internal layer 1 filtering circuitry for filtering the inputs measured at point A. The exact filtering mechanisms and how the measurements are actually executed at the PHY may be implementation specific. The measurements (e.g., beam specific measurements) are reported by the L1 filtering to layer 3 (L3) beam filtering circuitry and the beam consolidation/selection circuitry at point $A^1$.

The Beam Consolidation/Selection circuitry includes circuitry where beam specific measurements are consolidated to derive cell quality. For example, if N>1, else when N=1 the best beam measurement may be selected to derive cell quality. The configuration of the beam is provided by RRC signaling. A measurement (e.g., cell quality) derived from the beam-specific measurements are then be reported to L3 filtering for cell quality circuitry after beam consolidation/selection. In some embodiments, the reporting period at point B may be equal to one measurement period at point $A^1$.

The L3 filtering for cell quality circuitry is configured to filter the measurements provided at point B. The configuration of the Layer 3 filters is provided by the aforementioned RRC signaling or different/separate RRC signaling. In some embodiments, the filtering reporting period at point C may be equal to one measurement period at point B. A measurement after processing in the layer 3 filter circuitry is provided to the evaluation of reporting criteria circuitry at point C. In some embodiments, the reporting rate may be identical to the reporting rate at point B. This measurement input may be used for one or more evaluation of reporting criteria.

Evaluation of reporting criteria circuitry is configured to check whether actual measurement reporting is necessary at point D. The evaluation can be based on more than one flow of measurements at reference point C. In one example, the evaluation may involve a comparison between different measurements, such as a measurement provided at point C and another measurement provided at point $C^1$. In embodiments, the UE may evaluate the reporting criteria at least every time a new measurement result is reported at point C, $C^1$. The reporting criteria configuration is provided by the aforementioned RRC signaling (UE measurements) or different/separate RRC signaling. After the evaluation, measurement report information (e.g., as a message) is sent on the radio interface at point D.

Referring back to point $A^1$, measurements provided at point $A^1$ are provided to L3 Beam filtering circuitry, which is configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at $A^1$. The K beams may correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement is provided to beam selection for reporting circuitry at point E. This measurement is used as an input for selecting the X measurements to be reported. In embodiments, the reporting rate may be identical to the reporting rate at point $A^1$. The beam selection for beam reporting circuitry is configured to select the X measurements from the measurements provided at point E. The configuration of this module is provided by the aforementioned RRC signaling or different/separate RRC signaling. The beam measurement information to be included in a measurement report is sent or scheduled for transmission on the radio interface at point F.

The measurement reports include a measurement identity of an associated measurement configuration that triggered the reporting. The measurement reports may also include cell and beam measurement quantities to be included in measurement reports that are configured by the network (e.g., using RRC signaling). The measurement reports may also include number of non-serving cells to be reported can be limited through configuration by the network. Cells) belonging to a blacklist configured by the network are not used in event evaluation and reporting. By contrast, when a whitelist is configured by the network, only the cells belonging to the whitelist are used in event evaluation and reporting. The beam measurements to be included in measurement reports are configured by the network, and such measurement reports include or indicate a beam identifier only, a measurement result, and beam identifier, or no beam reporting.

Figure 5:
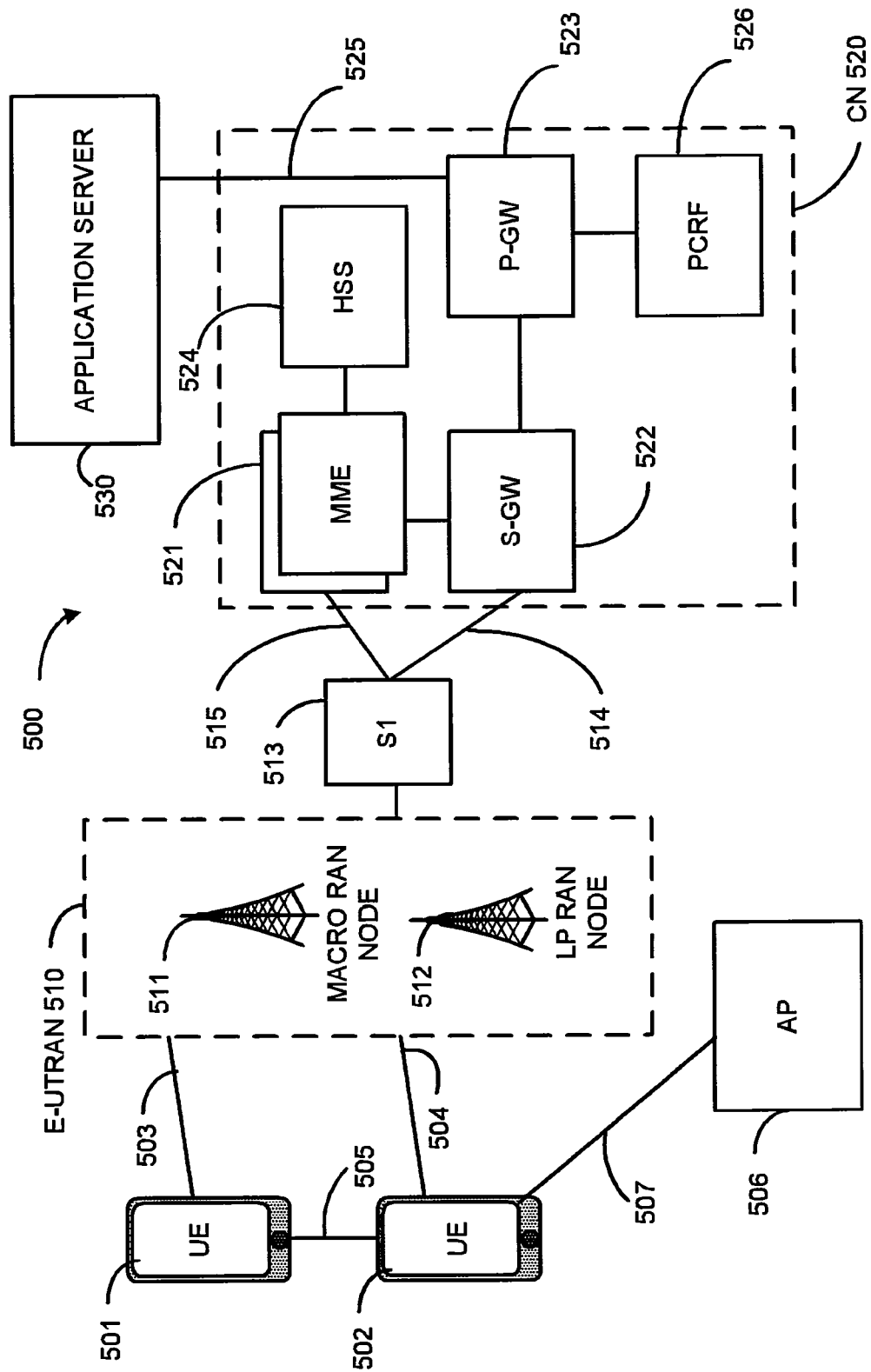
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Cartier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (TP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
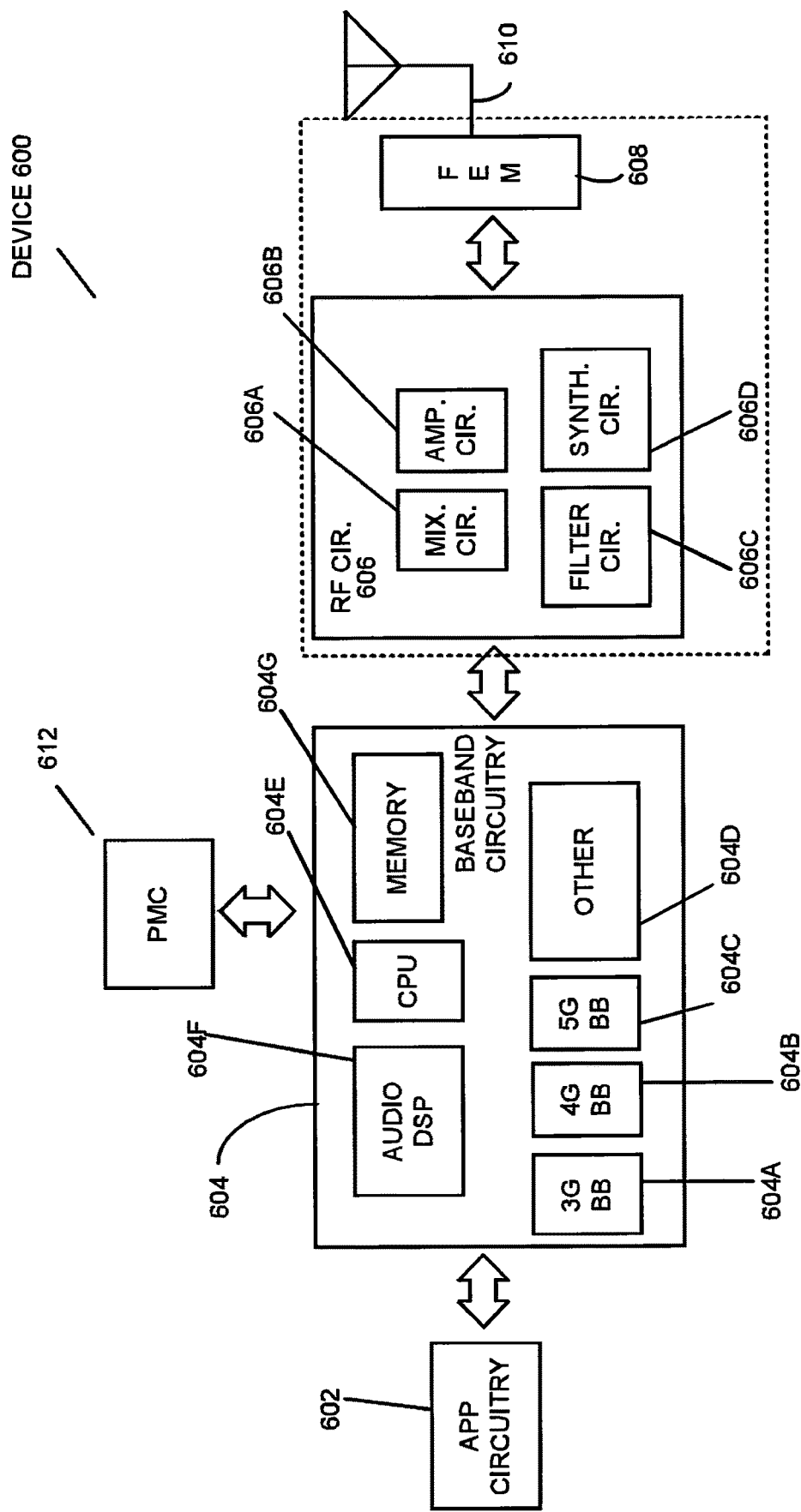
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FIT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
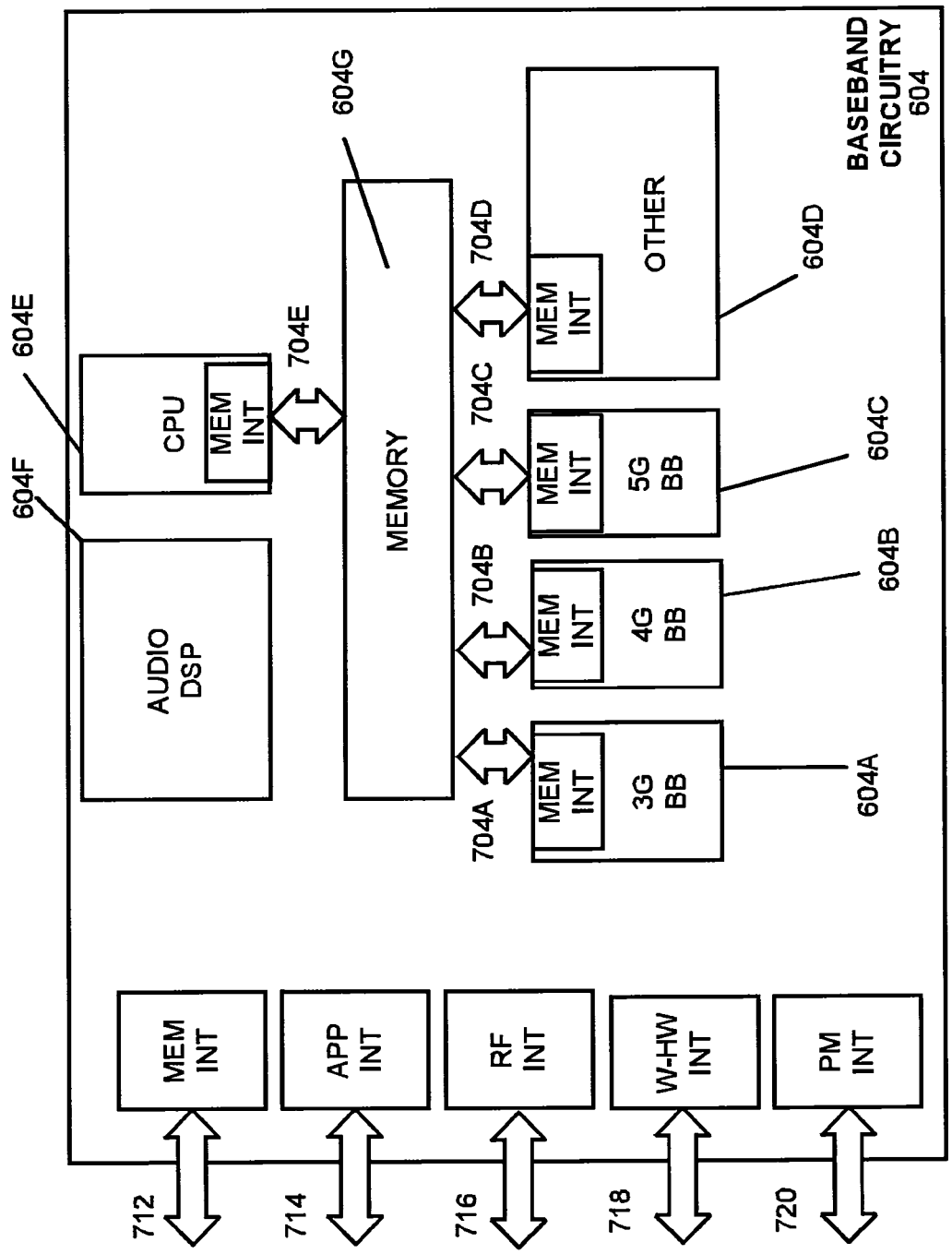
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
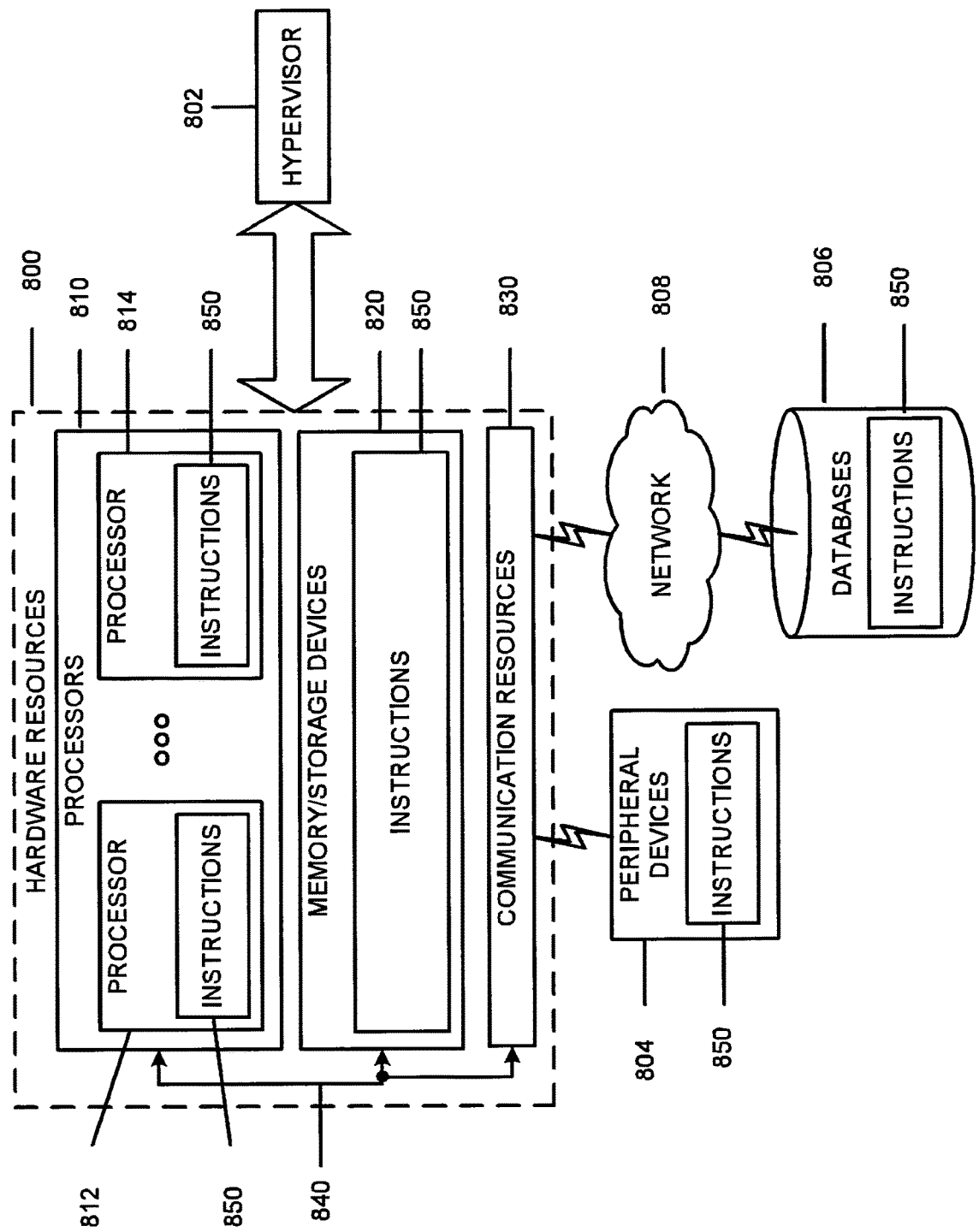
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components. NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at leas t one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 2:
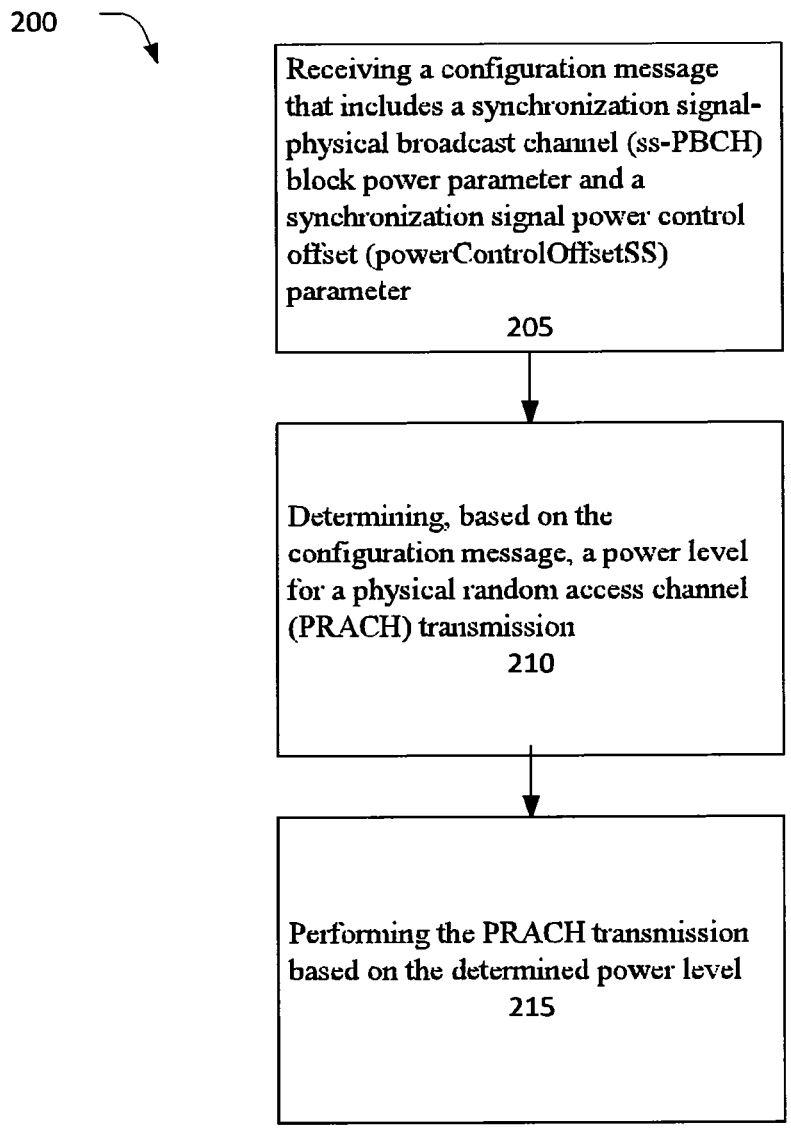
Figure 3:

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving, from memory, configuration information that a user equipment (UE) is to use to perform a periodic channel state information-reference signal (CSI-RS) reception, wherein the configuration information includes a synchronization signal-physical broadcast channel (ss-PBCH) block power parameter and a synchronization signal power control offset (powerControlOffsetSS) parameter. Operation flow/algorithmic structure 100 may further include, at 110, generating a message that includes the configuration information. Operation flow/algorithmic structure 100 may further include, at 115, encoding the message for transmission to the UE.

Another example of an operation flow/algorithmic structure is depicted in FIG. 2, which may be performed by UE in accordance with some embodiments. In this example, operation flow/algorithmic structure 200 may include, at 205, receiving a configuration message that includes a synchronization signal-physical broadcast channel (ss-PBCH) block power parameter and a synchronization signal power control offset (powerControlOffsetSS) parameter. Operation flow/algorithmic structure 200 may further include, at 210, determining, based on the configuration message, a power level for a physical random access channel (PRACH) transmission. Operation flow/algorithmic structure 200 may further include, at 215, performing the PRACH transmission based on the determined power level.

Another example of an operation flow/algorithmic structure is depicted in FIG. 3, which may be performed by gNB in accordance with some embodiments. In this example, operation flow/algorithmic structure 300 may include, at 305, generating a configuration message that includes configuration information including: a synchronization signal-physical broadcast channel (ss-PBCH) block power parameter, and a synchronization signal power control offset (powerControlOffsetSS) parameter. Operation flow/algorithmic structure 300 may further include, at 310, encoding the configuration message for transmission to the UE.

Example 21 may include an apparatus comprising means to perform one or more elements of a method or process described herein.

Example 22 may include one or more non-transitory computer-readable media comprising instructions to cause an electronic device, upon execution of the instructions by one or more processors of the electronic device, to perform one or more elements of a method or process described herein.

Example 23 may include an apparatus comprising logic, modules, and/or circuitry to perform one or more elements of a method described in or related to any method or process described herein.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
  a memory configured to store configuration information that a user equipment (UE) is to use to perform a periodic channel state information-reference signal (CSI-RS) reception, wherein the configuration information comprises a synchronization signal-physical broadcast channel (ss-PBCH) block power parameter and a synchronization signal power control offset (powerControlOffsetSS) parameter; and
  processing circuitry, coupled with the memory, configured to:
    retrieve the configuration information from the memory;
    generate a message that includes the configuration information; and
    encode the message for transmission to the UE,
  wherein the configuration information enables the UE to determine a reference signal power (referenceSignal- Power) of a physical random access channel (PRACH) transmission based on the ss-PBCH block power parameter or based on the ss-PBCH block power parameter and the powerControlOffsetSS parameter depending on a configuration of the CSI-RS or downlink control information (DCI).

2. The apparatus of claim 1, wherein the powerControlOffsetSS parameter provides an offset of transmission power of a tracking reference signal (TRS) relative to a synchronization signal/physical broadcast channel (SS/PBCH) block transmission power.

3. The apparatus of claim 1, wherein the powerControlOffsetSS parameter provides an offset of a beam management reference signal (BMRS) relative to a synchronization signal/physical broadcast channel (SS/PBCH) block transmission power.

4. The apparatus of claim 1, wherein the CSI-RS is quasi co-located (QCL-ed) with a synchronization signal block (SSB), and wherein the ss-PBCH block power parameter is to indicate the referenceSignalPower.

5. The apparatus of claim 1, wherein the CSI-RS is not quasi co-located (QCL-ed) with a synchronization signal block (SSB), and wherein the powerControlOffsetSS parameter is to provide an offset of CSI-RS transmission power relative to a synchronization signal/physical broadcast channel (SS/PBCH) block transmission power indicated by the ss-PBCH block power parameter.

6. The apparatus of claim 1, wherein the configuration of the CSI-RS comprises whether the CSI-RS is quasi co-located (QCL-ed) with a synchronization signal block (SSB).

7. The apparatus of claim 1, wherein the DCI comprises a bit for indicating whether the ss-PBCH block power parameter or based on the ss-PBCH block power parameter and the powerControlOffsetSS parameter is used for the referenceSignalPower.

8. One or more non-transitory computer-readable media storing instructions that, when executed by one or more processors, cause a user equipment (UE) to:
receive a configuration message that comprises a synchronization signal-physical broadcast channel (ss-PBCH) block power parameter and a synchronization signal power control offset (powerControlOffsetSS) parameter;
determine, based on the configuration message, a power level for a physical random access channel (PRACH) transmission based on the ss-PBCH block power parameter or based on the ss-PBCH block power parameter and the powerControlOffsetSS parameter depending on a configuration of a channel state information-reference signal (CSI-RS) or downlink control information (DCI); and
perform the PRACH transmission based on the determined power level.

9. The one or more non-transitory computer-readable media of claim 8, wherein the powerControlOffsetSS parameter provides an offset of transmission power of a tracking reference signal (TRS) relative to a synchronization signal/physical broadcast channel (SS/PBCH) block transmission power when the CSI-RS for tracking is configured for quasi co-location (QCL) info 1 and wherein the TRS is a CSI-RS in a non-zero power (NZP) CSI-RS resource set configured with a TRS-Info parameter.

10. The one or more non-transitory computer-readable media of claim 8, wherein the powerControlOffsetSS parameter provides an offset of a beam management reference signal (BMRS) relative to a synchronization signal/physical broadcast channel (SS/PBCH) block transmission power when the CSI-RS for tracking is configured for quasi co-location (QCL) info 2.

11. The one or more non-transitory computer-readable media of claim 10, wherein the BMRS is a CSI-RS in a non-zero power (NZP) CSI-RS resource set configured with a higher layer parameter repetition.

12. The one or more non-transitory computer-readable media of claim 8, wherein the CSI-RS is quasi co-located (QCL-ed) with a synchronization signal block (SSB), and wherein the ss-PBCH block power parameter is to indicate a reference signal power (referenceSignalPower).

13. The one or more non-transitory computer-readable media of claim 8, wherein the CSI-RS is not quasi co-located (QCL-ed) with a synchronization signal block (SSB), and wherein the powerControlOffsetSS parameter is to provide an offset of CSI-RS transmission power relative to a synchronization signal/physical broadcast channel (SS/PBCH) block transmission power indicated by the ss-PBCH block power parameter.

14. The one or more non-transitory computer-readable media of claim 8, wherein:
the configuration of the CSI-RS comprises whether the CSI-RS is quasi co-located (QCL-ed) with a synchronization signal block (SSB), or
the DCI comprises a bit for indicating whether the ss-PBCH block power parameter or based on the ss-PBCH block power parameter and the powerControlOffsetSS parameter is used for a reference signal power (referenceSignalPower).

15. One or more non-transitory computer-readable media storing instructions that, when executed by one or more processors, cause a next-generation NodeB (gNB) to:
generate a configuration message comprising configuration information including: a synchronization signal-physical broadcast channel (ss-PBCH) block power parameter, and a synchronization signal power control offset (powerControlOffsetSS) parameter; and
encode the configuration message for transmission to a user equipment (UE),
wherein the configuration information enables the UE to determine a reference signal power (referenceSignalPower) of a physical random access channel (PRACH) transmission based on the ss-PBCH block power parameter or based on the ss-PBCH block power parameter and the powerControlOffsetSS parameter depending on a configuration of a channel state information-reference signal (CSI-RS) or downlink control information (DCI).

16. The one or more non-transitory computer-readable media of claim 15, wherein the powerControlOffsetSS parameter provides an offset of transmission power of a tracking reference signal (TRS) relative to a synchronization signal/physical broadcast channel (SS/PBCH) block transmission power, and wherein the TRS is a CSI-RS in a non-zero power (NZP) CSI-RS resource set configured with a TRS-Info parameter.

17. The one or more non-transitory computer-readable media of claim 15, wherein the powerControlOffsetSS parameter provides an offset of a beam management reference signal (BMRS) relative to a synchronization signal/physical broadcast channel (SS/PBCH) block transmission power, and wherein the BMRS is a CSI-RS in a non-zero power (NZP) CSI-RS resource set configured with a higher layer parameter repetition.

18. The one or more non-transitory computer-readable media of claim 15, wherein the CSI-RS is quasi co-located (QCL-ed) with a synchronization signal block (SSB), and wherein the ss-PBCH block power parameter is to indicate the referenceSignalPower.

19. The one or more non-transitory computer-readable media of claim 15, wherein the CSI-RS is not quasi co-located (QCL-ed) with a synchronization signal block (SSB), and wherein the powerControlOffsetSS parameter is to provide an offset of CSI-RS transmission power relative to a synchronization signal/physical broadcast channel (SS/PBCH) block transmission power indicated by the ss-PBCH block power parameter.

20. The one or more non-transitory computer-readable media of claim 15, wherein:
- the configuration of the CSI-RS comprises whether the CSI-RS is quasi co-located (QCL-ed) with a synchronization signal block (SSB), or
- the DCI comprises a bit for indicating whether the ss-PBCH block power parameter or based on the ss-PBCH block power parameter and the powerControlOffsetSS parameter is used for the referenceSignalPower.

* * * * *